3,006,941
STABILIZED METAL ALCOHOLATES
Anton Mudrak, Broadview Heights, and Larry E. Stevick, Parma, Ohio, assignors to The Harshaw Chemical Company, Cleveland, Ohio, a corporation of Ohio
No Drawing. Filed Aug. 22, 1960, Ser. No. 50,853
17 Claims. (Cl. 260—448)

This invention, which is a continuation-in-part of our copending application Serial No. 845,332, filed October 9, 1959, now abandoned, relates to novel reaction products of metal alcoholates and lactones.

The novel reaction products of this invention fall into the class of compounds known as stabilized metal alcoholates and more specifically that group of stabilized metal alcoholates which are suitable for mixture or reaction with other materials such as, for instance, carboxylic acids, oil esters, poly esters and alkyd monomers. Metal alcoholates may be designated by the general formula $Me(OR)_m$, wherein Me is a metal, R is an alkyl radical, and $m$ is an integer equal to the valence of the metal. The metal alcoholates designated by this characteristic formula have limited usages, primarily due to the fact that metal alcoholates are generally solid products and are subject to such rapid hydrolysis as to make their handling extremely difficult. It has been found, however, that the insertion of a suitable stabilizing group through the replacement of one alkoxy radical will result in a stabilized metal alcoholate which is a liquid product having sufficient stability to hydrolysis as to afford commercial handling. Stabilized metal alcoholates are commonly prepared by reacting B-keto esters and B-keto acids with metal alcoholates. The following equation is an illustration of the reaction of the enol form of a B-keto ester with a metal alcoholate.

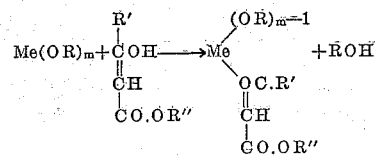

Wherein Me is a trivalent or quatravalent metal, R, R' and R'' are alkyl radicals and $m$ is an integer from 3 to 4.

Reacting B-keto esters and B-keto acids with metal alcoholates involves a keto-enol shift and results in the formation of byproduct alcohol. Alcohol stabilized metal alcoholate mixtures are undesirable in that the low flash point of certain alcohols would interfere with any subsequent high temperature reactions of the stabilized metal alcoholate with various other organic compounds. Removal of the byproduct alcohol results, of course, in additional expense in preparation of the stabilized metal alcoholate. The formation of alcohol is also undesirable in that the resulting weight of the marketable reaction product is reduced by the equivalent amount of byproduct alcohol.

I have now discovered new and novel stabilized metal alcoholates resulting from the reaction of metal alcoholates, said reaction not being dependent on the keto-enol shift and not resulting in the formation of a byproduct alcohol. The novel stabilized metal alcoholates of this invention which are obtained by the reaction of a metal alcoholate having the general formula $Me(OR)_m$ with a lactone selected from the group consisting of beta-propiolactone, gamma-butyrolactone and valero-lactone under controlled temperature conditions, have the following general formula:

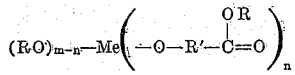

wherein R is an alkyl group having a carbon chain length of from $C_1$ to $C_{18}$, Me is a metal selected from the group consisting of aluminum, zirconium and titanium, R' is an alkylene radical having a carbon chain length of from $C_2$ to $C_4$, $n$ is an integer of from 1 to a number equal to the valence of said metal, $m$ is an integer equal to the valence of said metal, and the oxygen to metal linkages are such as to form compounds selected from the class consisting of chelate compounds and open chain compounds.

The stabilized metal alcoholates which are obtained by the reaction of a metal alcoholate with propiolactone have the following general formula:

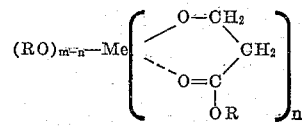

wherein R is an alkyl group having a carbon chain length of from $C_1$ to $C_{18}$, Me is a metal selected from the group consisting of aluminum, zirconium and titanium, $n$ is an integer of 1 to 3, and $m$ is an integer equal to the valence of said metal.

The stabilized metal alcoholates which are obtained by the reaction of metal alcoholates with butyrolactone may have either of the following formulas; the second of which is also a general formula for the reaction product of a metal alcoholate and valerolactone:

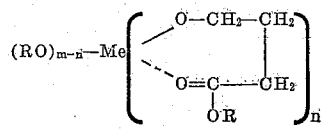

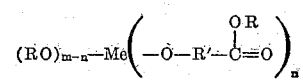

wherein R is an alkyl group having a carbon chain length of from $C_1$ to $C_{18}$, Me is a metal selected from the group consisting of aluminum, zirconium, and titanium, R' is an alkylene radical having a carbon chain length of from $C_3$ to $C_4$, $n$ is an integer of from 1 to a number equal to the valence of said metal, and $m$ is an integer equal to the valence of said metal.

Various metal alcoholates and lactones have been found suitable for the preparation of the new stabilized metal alcoholates. Suitable lactones are beta-propiolactone, gamma-butyrolactone, and valero-lactone. Suitable metal alcoholates are metal alcoholates wherein the metal is selected from the group consisting of aluminum, zirconium and titanium, and the alkyl radical of the alkoxy group is selected from alkyl groups having a carbon length from $C_1$ to $C_{18}$, such as, for instance, methyl, ethyl, isopropyl, secondary butyl, normal butyl, hexyl, n-hexyl, 2-ethyl hexyl, lauryl, tridecyl, n-octadecyl, isooctadecyl, cetyl, and stearyl. The specific metal alcoholates and lactones are given merely for purposes of illustration and are not considered to limit the spirit or scope of the invention.

The reactions undergone by the metal alcoholates and lactones are illustrated by the following equations. The equations are given in equal molecular amounts for purposes of simplifying the illustration. It should be understood, however, that the reaction may be carried out with anywhere from one to four moles of lactone reacted per mole of metal alcoholate. The reaction will go to completion when the molecular amounts of reactants are kept within the given range.

The reaction with propiolactone forms a 6-membered chelate ring as shown in the following example:

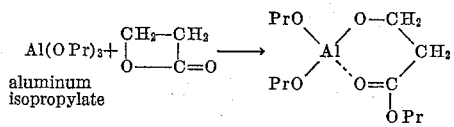

The butyrolactone reaction product may form an open chain compound as shown in the following example:

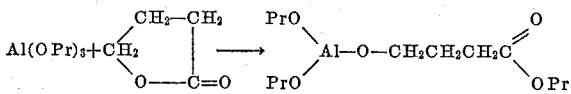

or a chelate compound as illustrated by the following formula:

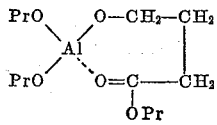

The new stabilized metal alcoholates are usually prepared by melting a metal alcoholate in a flask and then adding a lactone by dropwise addition. The reaction mass is maintained at a temperature just great enough to keep said mass in the liquid phase. In practice, the reaction mass is maintained at a temperature in the range of from about 55° C. to about 95° C. Because of a tendency to produce decomposition products at higher temperatures, the preferred range is about 60° C. to about 75° C. Upon completion of the addition of metal alcoholate, the reaction mass is stirred for a period of from two to four hours while maintaining the temperature in the range from about 55° C. to about 95° C. and preferably from about 60° C. to about 75° C. The resultant product is a stabilized metal alcoholate wherein from one to a possible maximum of four moles of lactone are coupled with one mole of metal alcoholate.

*Example I*

153.1 g. of Al(OPr)$_3$ was melted and then cooled to 70° C. 54 g. of B-propiolactone was then added dropwise. The reaction was highly exothermic and a water bath was used to control the temperature. As the reaction mass increased in viscosity, the temperature was allowed to rise to 90° C. On completion of the addition of B-propiolactone the product was stirred at 90° C. to 95° C. The resultant reaction product was found to have 1 mole of propiolactone coupled with 1 mole of Al(OPr)$_3$.

*Example II*

612.6 g. of Al(OPr)$_3$ was melted in a round-bottomed flask and cooled to 80° C. 432.4 g. of B-propiolactone was then added dropwise over a thirty-minute period. The exothermic reaction was controlled by a water bath so that the temperature was maintained below 95° C. After the completion of the addition of the B-propiolactone, the reaction mass was stirred for three hours from 90° C. to 95° C. The reaction mass was found to have two moles of propiolactone coupled with one mole of Al(OPr)$_3$.

*Example III*

102.1 g. of Al(OPr)$_3$ was melted and cooled to 70° C. 108.1 g. of B-propiolactone was then added dropwise. The reaction was found to be highly exothermic and a water bath was used to control the temperature. As the reaction mass became more viscous, the temperature was allowed to rise to 95° C. On completion of the addition of B-propiolactone (about 15 minutes) the reaction mass was stirred for 2 hours at about 95° C. The reaction mass was found to have 3 moles of propiolactone coupled with 1 mole of Al(OPr)$_3$.

*Example IV*

183.8 g. of Al(OPr)$_3$ was melted in a 500 ml. flask and then cooled to about 80° C. 77.5 g. of butyro-lactone was added dropwise over a 10 minute period. The reaction was found to be exothermic and was cooled by means of a water bath to a temperature below 95° C. The reaction mass was maintained at this temperature as sludge-like deposits developed below 80° C. Upon completion of the addition of the butyro-lactone, the reaction mass was stirred for three hours at 95° C. The reaction mass was found to contain 1 mole of butyro-lactone coupled with 1 mole of Al(OPr)$_3$.

*Example V*

506.2 g. of aluminum secondary butoxide were heated to 65° C. 148.4 g. of B-propiolactone was then added dropwise over a 10 to 15 minute period. The reaction was found to be exothermic and the temperature was controlled by means of a water bath so as not to exceed 95° C. After completion of the addition of B-propiolactone, the reaction mass was stirred at 90° C. to 95° C. for three hours. The reaction mass was found to contain 1 mole of B-propiolactone coupled with 1 mole of aluminum secondary butoxide.

*Example VI*

156.2 g. of aluminum tri-tridecylate was heated at 65° C. 18.0 g. of B-propiolactone was then added dropwise. The reaction mass was found to be highly exothermic and was cooled by means of a water bath so that the temperature was kept below 70° C. After completion of the addition of B-propiolactone the reaction mass was stirred for two hours at 70° C. The reaction mass was found to have 1 mole of B-propiolactone coupled with 1 mole of aluminum tri-tridecylate.

*Example VII*

166.8 g. of aluminum tri-octadecoxide was heated to 85° C. 14.4 g. of B-propiolactone was added dropwise over a five minute period. The temperature was controlled by means of a water bath to below 95° C. After completion of the addition of B-propiolactone the reaction mass was stirred for three hours at 90° C. to 95° C. The reaction mass was found to contain one mole of B-propiolactone coupled with one mole of aluminum tri-octadecoxide.

*Example VIII*

191.5 g. of a 90% solution of zirconium butoxide in xylene was heated to 75° C. 32.4 g. of B-propiolactone was added dropwise over a ten minute period. The reaction was found to be exothermic and was controlled by means of a water bath to a temperature below 80° C. After completion of the addition of B-propiolactone the reaction mass was stirred for two hours at a temperature from 75° C. to 80° C. The reaction product was found to contain 1 mole of B-propiolactone coupled with 1 mole of zirconium butoxide.

*Example IX*

170.5 g. of Ti(OPr)$_4$ was heated to 65° C. 43.6 g. of B-propiolactone was added dropwise. The reaction was found to be exothermic and the temperature was controlled by means of a water bath to below 70° C. After completion of the addition of the B-propiolactone the reaction mass was stirred for two hours at a temperature of from 65° C. to 70° C. The reaction mass was found to contain 1 mole of B-propiolactone coupled with 1 mole of Ti(OPr)$_4$.

*Example X*

102.1 g. of aluminum isopropylate was melted in a reaction vessel and cooled to 80° C. 195.3 g. of iso-octyl alcohol was then added after first having dried the alcohol by means of a benzene-water azeotropic distillation. The mixture was then heated and isopropanol was distilled off as the temperature of the reactants was gradually increased to 175° C. 36.0 g. of B-propiolactone was then added in 15 minutes to the aluminum tri-isooctadecoxide distilland; the reaction temperature being kept at 60° C. to 65° C. The reaction mixture was stirred for 3 hours, after which time the reaction was found to have gone to completion. The product was found to consist of aluminum di-isooctodecoxy carboisooctodecoxyethoxide.

*Example XI*

102.1 g. of aluminum isopropylate was melted in a reaction vessel and cooled to 80° C. 195.3 g. of 2-ethylhexanol in a Stoddard solvent solution was then added rapidly. The reaction mixture was stirred and the temperature slowly increased to a maximum of 170° C. Isopropyl alcohol was then distilled from the reaction mixture and the aluminum tri-2-ethylhexoxide distilland cooled to 60° C. 36.0 g. of B-propiolactone was added over a 10 minute period, temperature being maintained below 65° C. Stirring of the reaction mixture was continued for a two hour period, while the reaction temperature was maintained at 60° C. to 65° C. The reaction product was found to be aluminum di-2-ethylhexoxycarbethylhexoxyethoxide.

*Example XII*

102.1 g. of aluminum isopropylate was melted in a reaction vessel and cooled to 85° C. 153.2 g. of n-hexyl alcohol was then added and the solution stirred at reflux for one hour. Isopropyl alcohol was then distilled off as the temperature of the reaction mixture was gradually raised to 175° C. The product of this reaction was aluminum tri-n-hexoxide. The aluminum tri-n-hexoxide was cooled to 60° C. and 36.0 g. of B-propiolactone was added dropwise over a 15-minute period; the temperature being kept below 65° C. The reaction mixture was then stirred for two hours, the temperature being maintained at 60° C. to 65° C. The final product was found to be aluminum di-hexoxy-carbohexoxyethoxide.

*Example XIII*

51.3 g. of aluminum isopropylate was melted and cooled to 80° C. 203.3 g. of n-octadecyl alcohol was then added. The mixture was heated in the range of 120° C. to 160° C. at which temperature isopropyl alcohol was distilled off. The aluminum tri-n-octadecoxide distilland was cooled to 65° C. and 18.1 g. of B-propiolactone was added over a 15-minute period; temperature being maintained below 75° C. The reaction mixture was stirred over a 2½ hour period, with the temperature being maintained at 70° C. to 75° C. The final product was found to be aluminum di-octadecoxy carboctadecoxyethoxide.

The novel stabilized metal alcoholates of the invention have been found to be suitable for use as catalysts in the curing of epoxy and phenolic resins and as modifying agents for synthetic and natural drying oils. The new stabilized metal alcoholates having reactive alkoxy groups are also useful in reactions at elevated temperatures with carboxylic acids, oil esters, polyesters and alkyd monomers to form polymeric resins.

Having thus described our invention, what we claim is:

1. As a new composition of matter the reaction product of a metal alcoholate and a lactone said new composition of matter having the following general formula:

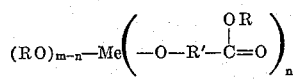

wherein R is an alkyl radical selected from the group consisting of methyl, ethyl, isopropyl, secondary butyl, normal butyl, hexyl, 2-ethyl hexyl, lauryl, tridecyl, n-octadecyl, isooctadecyl, cetyl and stearyl, Me is a metal selected from the group consisting of aluminum, zirconium and titanium, R' is an alkylene radical having a carbon chain length of from $C_2$ to $C_4$, n is an integer from 1 to a number equal to the valence of said metal, m is an integer equal to the valence of said metal, and the oxygen to metal linkages are such as to form compounds selected from the class consisting of chelate compounds and open chain compounds.

2. As a new composition of matter, the reaction product of claim 1 wherein R is an isopropyl group, and Me is aluminum.

3. As a new composition of matter, the reaction product of claim 1 wherein R is a secondary butyl group, and Me is aluminum.

4. As a new composition of matter the reaction product of a metal alcoholate and a lactone said new composition of matter having the following general formula:

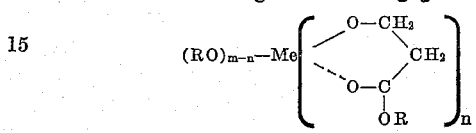

wherein R is an alkyl radical selected from the group consisting of methyl, ethyl, isopropyl, secondary butyl, normal butyl, hexyl, 2-ethyl hexyl, lauryl, tridecyl, n-octadecyl, isooctadecyl, cetyl and stearyl, Me is a metal selected from the group consisting of aluminum, zirconium and titanium, n is an integer from 1 to a number equal to the valence of said metal, and m is an integer equal to the valence of said metal.

5. As a new composition of matter, the reaction product of claim 4 wherein R is an isopropyl group and Me is aluminum.

6. As a new composition of matter, the reaction product of claim 4 wherein R is a secondary butyl group, and Me is aluminum.

7. As a new composition of matter, the reaction product of a metal alcoholate and a lactone said new composition of matter having the following general formula:

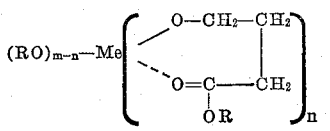

wherein R is an alkyl radical selected from the group consisting of methyl, ethyl, isopropyl, secondary butyl, normal butyl, hexyl, 2-ethyl hexyl, lauryl, tridecyl, n-octadecyl, isooctadecyl, cetyl and stearyl, Me is a metal selected from the group consisting of aluminum, zirconium, and titanium, n is an integer from 1 to a number equal to the valence of said metal, and m is an integer equal to the valence of said metal.

8. As a new composition of matter, the reaction product of claim 7 wherein R is an isopropyl group and Me is aluminum.

9. As a new composition of matter the reaction product of claim 7 wherein R is a secondary butyl group and Me is aluminum.

10. As a new composition of matter, the reaction product of a metal alcoholate and a lactone said new composition of matter having the following general formula:

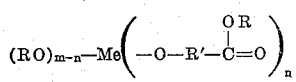

wherein R is an alkyl radical selected from the group consisting of methyl, ethyl, isopropyl, secondary butyl, normal butyl, hexyl, 2-ethyl hexyl, lauryl, tridecyl, n-octadecyl, isooctadecyl, cetyl and stearyl, Me is a metal selected from the group consisting of aluminum, zirconium, and titanium, R' is an alkylene radical having a carbon chain length of from $C_3$ to $C_4$, n is an integer from 1 to a number equal to the valence of said metal, and m is an integer equal to the valence of said metal.

11. As a new composition of matter, the reaction product of claim 10 wherein R is an isopropyl group and Me is aluminum.

12. As a new composition of matter, the reaction product of claim 10 wherein R is a secondary butyl group and Me is aluminum.

13. A process for the preparation of a stabilized metal alcoholate comprising melting a metal alcoholate having the formula $Me(OR)_m$ wherein Me is a metal selected from the group consisting of aluminum, zirconium and titanium, R is an alkyl radical selected from the group consisting of methyl, ethyl, isopropyl, secondary butyl, normal butyl, hexyl, 2-ethyl hexyl, lauryl, tridecyl, n-octadecyl, isooctadecyl, cetyl and stearyl, and $m$ is an integer equal to the valence of said metal, and adding a lactone selected from the group consisting of B-propiolactone, butyrolactone, and valero-lactone by dropwise addition while maintaining the reaction mass at a temperature sufficient to keep said mass in a liquid phase.

14. A process of claim 13 wherein R is an isopropyl group and Me is aluminum.

15. The process of claim 13 wherein R is a secondary butyl group and Me is aluminum.

16. The process of claim 13 wherein the reaction mass is maintained at a temperature in the range of from about 55° C. to about 95° C.

17. The process of claim 13 wherein the reaction mass is maintained at a temperature from about 60° C. to about 75° C.

No references cited.